US010652168B2

(12) United States Patent
Brown et al.

(10) Patent No.: US 10,652,168 B2
(45) Date of Patent: May 12, 2020

(54) PACKET INSPECTION TO DETERMINE DESTINATION NODE

(71) Applicant: HEWLETT PACKARD ENTERPRISE DEVELOPMENT LP, Houston, TX (US)

(72) Inventors: Andrew Brown, Houston, TX (US); Justin E York, Cypress, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 283 days.

(21) Appl. No.: 15/110,648

(22) PCT Filed: Jan. 8, 2014

(86) PCT No.: PCT/US2014/010600
§ 371 (c)(1),
(2) Date: Jul. 8, 2016

(87) PCT Pub. No.: WO2015/105480
PCT Pub. Date: Jul. 16, 2015

(65) Prior Publication Data
US 2016/0330142 A1    Nov. 10, 2016

(51) Int. Cl.
*G06F 1/3209* (2019.01)
*G06F 1/3287* (2019.01)
*H04L 12/931* (2013.01)
*H04L 12/12* (2006.01)
*G06F 15/78* (2006.01)

(52) U.S. Cl.
CPC .......... *H04L 49/405* (2013.01); *G06F 1/3209* (2013.01); *G06F 1/3287* (2013.01); *G06F 15/7825* (2013.01); *H04L 12/12* (2013.01); *Y02D 50/40* (2018.01); *Y02D 50/42* (2018.01)

(58) Field of Classification Search
CPC ...................................................... G06F 1/3209
See application file for complete search history.

(56) References Cited

U.S. PATENT DOCUMENTS

| 7,325,149 | B2 | 1/2008 | Liu et al. |
| 8,234,510 | B2 | 1/2012 | Diab et al. |
| 8,140,871 | B2 | 3/2012 | Abdul et al. |
| 8,332,869 | B2* | 12/2012 | Stevens, IV ............ H04L 41/00 714/22 |
| 9,665,156 | B2* | 5/2017 | Ragupathi ............. G06F 1/3209 |
| 2005/0182977 | A1 | 8/2005 | Powers |

(Continued)

OTHER PUBLICATIONS

ISA/KR, International Search Report dated Oct. 15, 2014, PCT/US2014/010600, 10 pps.

(Continued)

*Primary Examiner* — Nitin C Patel
*Assistant Examiner* — Eric Chang
(74) *Attorney, Agent, or Firm* — Hewlett Packard Enterprise Patent Department

(57) ABSTRACT

Techniques to inspect packets to determine a destination node are provided. In one aspect, a Wake on Lan (WOL) packet may be received at a switch. A destination node of the WOL packet may be determined. An indication of the determined destination node may be sent to a management controller. The management controller may cause the destination node to awaken.

18 Claims, 6 Drawing Sheets

(56) References Cited

U.S. PATENT DOCUMENTS

| | | |
|---|---|---|
| 2007/0070998 A1 | 3/2007 | Sethuram |
| 2009/0133040 A1 | 5/2009 | Stevens, IV |
| 2010/0250914 A1 | 9/2010 | Abdul |
| 2011/0113127 A1 | 5/2011 | Tameshige |
| 2011/0138044 A1* | 6/2011 | Bailey .................... H04L 12/12 709/225 |
| 2011/0185199 A1 | 7/2011 | Hung et al. |
| 2012/0054507 A1 | 3/2012 | Noel |
| 2012/0120958 A1* | 5/2012 | Mahadevan ............ H04L 12/12 370/392 |
| 2012/0210112 A1* | 8/2012 | Suganami ............... H04L 12/12 713/2 |
| 2013/0097435 A1 | 4/2013 | Sequin et al. |
| 2013/0124895 A1 | 5/2013 | Saha et al. |

OTHER PUBLICATIONS

Macia-Perez, F. et al.; Wake on LAN Over the Internet as Web Service System on Chip; http://ieeexplore.ieee.org/stamp/stamp.jsp?tp=&arnumber=5210162 > on Page(s): (cont'd) Pages 839-849: Mar. 2011.

Sathe, S.; System Awareness Improves SOC Power Management; http://www.eetimes.com/document.asp?doc_id=1278642 >; Mar. 18, 2011.

* cited by examiner

PACKET INSPECTION TO DETERMINE DESTINATION NODE

BACKGROUND

Modern computers typically include a power control system which receives signals indicating if the computer is to be powered on or powered off. For example, the power button on a computer may not be directly connected to the computer's power supply. Instead, pressing the power button generates a signal, often called a power management event (PME), which is received by power control circuitry within the computer that is always active as long as the computer is connected to power. This circuitry, in turn, activates the power supply of the computer, if the computer was off, thus turning the computer on. Likewise, if the computer was already on, the PME event would cause the computer to shutdown.

In addition, certain components of the computer may be configured to always remain available to some extent, regardless of the power state of the overall computer. For example, a network interface controller (NIC) may be configured to remain on regardless of the power state of the computer. When the NIC receives a certain packet, often referred to as a magic packet, the NIC may generate a power on signal, similar to the one described above. Thus, a computer that is in an off state may be woken up through a local area network (LAN) connection. Remote power on of a computer over a network is often referred to as Wake on LAN (WOL) and the magic packet may also be referred to as a WOL packet.

DETAILED DESCRIPTION

Figure 1:
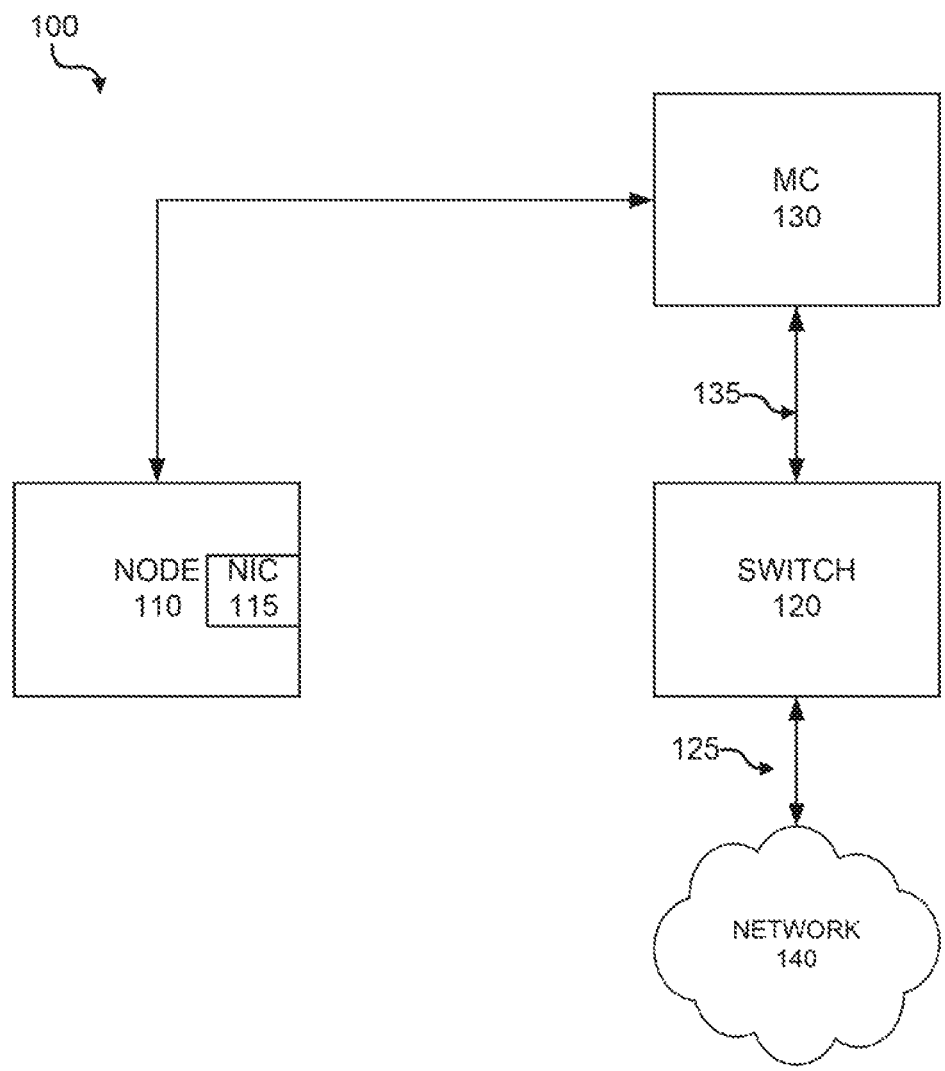
FIG. 1 is an example of a system that may be used to remotely power on a node using a magic packet, according to techniques described herein.

The WOL functionality described above relies on at least a portion of the computing system being able to continuously receive power. For example, in order for a magic packet to be received, the NIC must always be at least minimally powered on, such that a magic packet may be received. In many computer systems, this does not pose a problem, as the NIC may be a separate component. For example the NIC may be a physically separate card that is plugged into the computer motherboard or may be a separate integrated circuit on the motherboard. Thus, ensuring the NIC is always powered is a relatively straightforward task.

A problem may arise when it is no longer possible to separate the NIC functionality from the remainder of the computer. For example, in the case of System on a Chip (SoC) architectures, the components that make up a computer (e.g. processor, NIC, memory controller, chipset, etc) are integrated into a single integrated circuit. Thus, it may no longer be possible to provide power to the NIC only, while allowing the remainder of the SOC functionality to remain powered off. In other words, the SoC is either powered on or powered off. It may not be possible to selectively power certain portions of functional on the SoC. Although the examples below are presented in terms of a SoC, it should be understood that the techniques described herein are applicable in any architecture in which the NIC may not support WOL functionality. The use of SoC terminology is for purposes of ease of description and not by way of limitation.

One of the uses of WOL is to allow a computer that is currently not being actively used to essentially power off, thus reducing the amount of power consumed. The small amount of power consumed by the NIC allows the computer to remotely be awakened using a magic packet. As should be clear, this functionality may no longer be available in a SOC architecture. Because the SoC may not selectively power only the NIC portion, there may be no way for the SOC to receive a magic packet. Thus, there may be no way to remotely power on a SoC based computer using the magic packet mechanism. It is also possible that even if the SoC NIC is powered on, it may implement a limited feature set that does not include WOL detection.

The techniques described herein overcome this problem by making use of packet inspection capabilities of a switch. In many computing systems, computers, which may also be referred to as a nodes, are connected to a network via a switch. The switch may be used to inspect incoming packets to detect when a magic packet arrives. The switch may then inform a management controller of the receipt of the magic packet. The management controller in turn, may be coupled to the SOC computer. The management controller may have the ability to power on the SoC. Thus, upon notification from the switch that a magic packet for a particular node has been detected, the management controller may cause power to be supplied to the SoC computer, causing the SoC computer to power on. These techniques are described in further detail below and in conjunction with the appended figures.

FIG. 1 is an example of a system that may be used to remotely power on a node using a magic packet, according to techniques described herein. System 100 may include a node 110, a switch 120, a management controller (MC) 130, and a network 140. The node 110 may be a computer utilizing a SoC architecture. In other words, it may not be possible to separately power portions of the node. Thus, the node is either on, and capable of receiving data packets, or is off and is not capable of receiving data packets (including magic packets). The node 110 may include a network interface controller (NIC) 115. The NIC may include an address that identifies the interface, which in turn identifies the node. For example, the address may be a media access control (MAC) address. Magic packets utilize the MAC address to identify the node that is to be powered on.

The system may also include a switch 120. The switch may connect the node 120 to an external network 140. Data packets received from the external network may be sent to the proper destination node by the switch. The switch may also have the ability to inspect incoming data packets, as will be described in further detail below. The network 140 may be any form of communications channel that allows external elements, such as other computers, to communicate with the node 110. For example, the network may be an Ethernet network. However, it should be understood that the particular technology for network 140 is unimportant. Any suitable network may utilize the techniques described herein.

Coupled to the switch may be a management controller (MC). A MC may be a processor that is utilized to provide management functions to a node. Included in those management functions may be the ability to turn the node on or off. Although only a single node is shown, it should be understood that there may be any number of nodes. In addition, a single MC may be connected to multiple nodes. Thus, a single or small set, of MCs may provide management functions for a larger set of nodes.

In operation, the WOL packet, (i.e. the magic packet) may be detected by switch 120. The magic packet may be received from network 140 over communications channel 125. Communications channel 125 may be a link between the network 140 and the switch. For example, communications channel 125 may be an Ethernet link between the network and the switch. The switch may inspect all incoming packets for the presence of a magic packet. The magic packet has a defined format, thus it is possible for switch to examine each incoming packet to determine if it is a magic packet.

Upon detection of a magic packet, the switch may determine the destination node for the magic packet. As explained above, the magic packet includes a MAC address of the NIC that is the destination of the packet. Thus, the switch may examine the magic packet to determine the destination MAC address. This address may then be used to determine the node that is the destination.

The switch may then send an indication of the determined node to the MC 130. As explained above, the MC may provide management functions to one or more nodes. The management functions may include the ability to power the node on and off. The switch may send the indication to the MC over a second communication channel 135. The second communication channel may be any suitable communication mechanism. For example, the second communication channel may be an Ethernet network, such as a management Ethernet network. Regardless of the specific technology used, what should be understood is that the first and second communication channels are separate communication channels.

Upon receipt of the indication from the switch that a node has received a magic packet, the MC may determine which node was the destination for the magic packet. In some implementations, the switch itself may send the MAC address included in the magic packet to the MC and the MC determines the destination node. In other implementations, the switch itself determines the destination nodes, and sends a node identifier to the MC. Regardless of implementation, the MC is made aware of which node was to have received a magic packet. The MC may than cause the indicated node to power up using the management functions provided by a MC.

Figure 2:
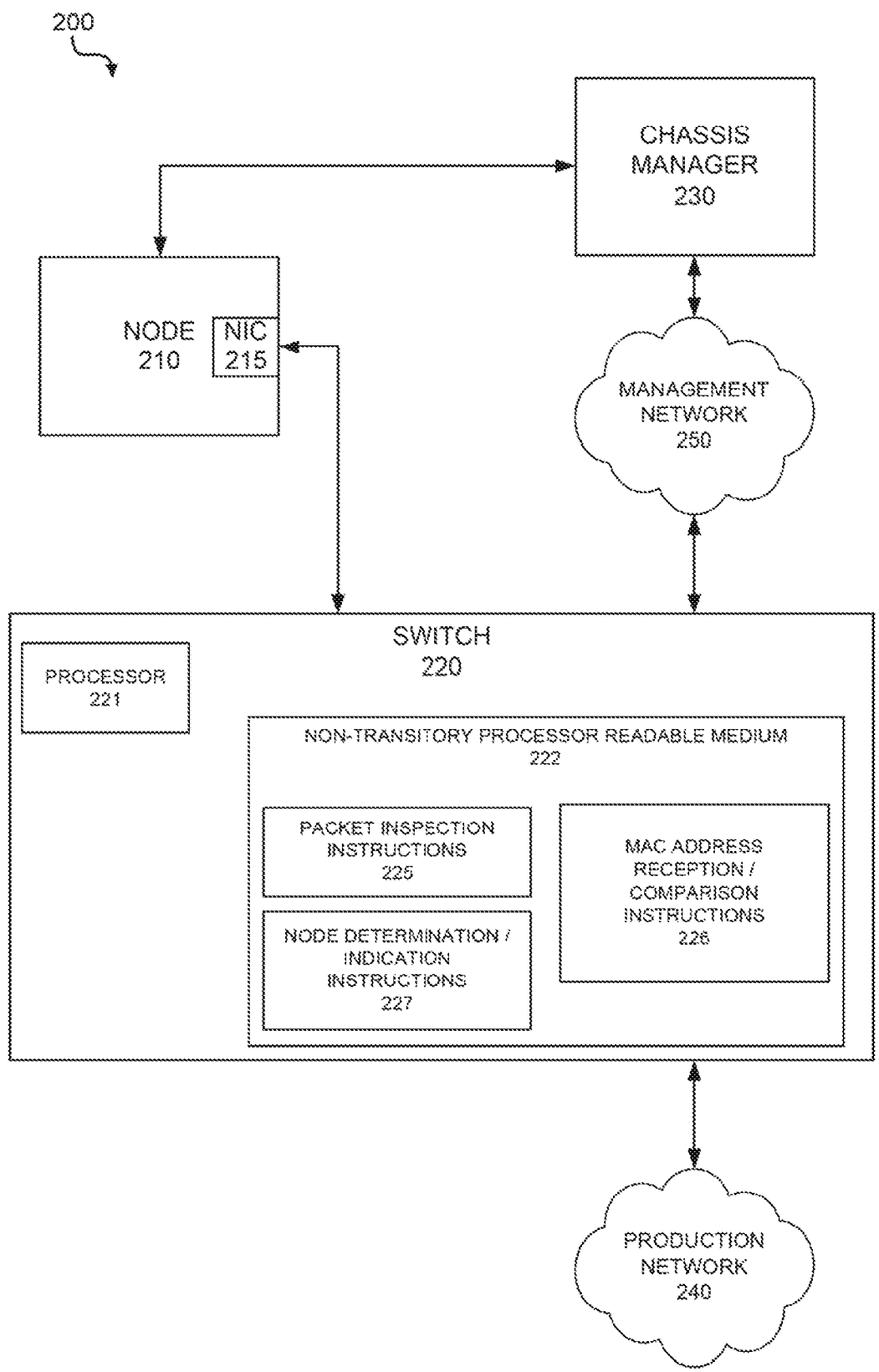
FIG. 2 is another example of a system that may be used to remotely power on a node using a magic packet, according to techniques described herein.

FIG. 2 is another example of a system that may be used to remotely power on a node using a magic packet, according to techniques described herein. Many of the elements depicted in FIG. 2 are similar or the same as those depicted in FIG. 1. For purposes of brevity, only those elements that are different from those depicted in FIG. 1 are described in detail.

System 200 includes node 210 which includes MC 215. Node 210 is essentially the same as node 110 from FIG. 1 and is not described in further detail. Also, just as above, although only one node is depicted, it should be understood that this is for purposes of ease of description and not by way of limitation. System 200 may include any number of nodes. The system may also include a switch 220, which is described in further detail below.

System 200 may also include a chassis manager 230. The chassis manager 230 may provide MC functionality to all nodes that are contained in a single chassis. For example, a particular computing system architecture may comprise a chassis which may hold cartridges. The chassis may provide common resources, such as power and cooling to the cartridges. Each cartridge may contain one or more computers that utilize the SoC architecture. Thus, each cartridge may contain one or more nodes that may be the target of a magic packet. The chassis manager may provide MC functionality to all of the nodes within the chassis. As explained above, the MC may provide the ability to power on and off the nodes. As such, the chassis manager may be able to power on and off all of the nodes contained within a chassis.

The switch may be connected to the external world through a production network 240. The production network may be the network that connects the nodes in the chassis to the users that wish to use the resources of the computing system. For example, in the case of a computer system that provides web pages, the production network may be the Internet. The production network allows external users to connect to the nodes via the switch. System 200 may also include a management network 250. The management network may connect the switch to the chassis manager. The management network may also connect other components within the chassis (not shown). However, what should be understood is that the production and management networks are two separate networks. It should be understood that the separation may be physical, such as by using completely isolated hardware, or may be logical, such as by using Virtual Local Area Network (VLAN) technology. What should be understood is that the communication channel between the switch and the chassis manager is isolated from the communication channel between the switch and the nodes.

Switch 220 may include processor 221. The processor may be coupled to a non-transitory processor readable medium 222. The processor readable medium may contain thereon a set of instructions, which then executed by the processor, cause the processor to implement the techniques described herein. For example, the medium 222 may include packet inspection instructions 225. The packet inspection instructions may cause the processor to examine all packets received from the production network for the presence of a magic packet.

The medium may also include MAC address reception/comparison instructions 226. In some implementations, the switch may receive a list of MAC addresses and the associated nodes. For example, the list may come from the chassis manager. In other implementations, the list may come from an external source (not shown). What should be understood is that the switch may receive a list of MAC addresses. When a magic packet is received, the switch may compare the MAC address in the magic packet to the received list of MAC addresses. If the MAC address in the magic packet is contained in the list, the node may need to be awakened.

The medium may also include node determination/indication instructions. As explained above, the switch may examine incoming packets for the presence of a magic packet. If a magic packet is received, a comparison may be made to a list of MAC addresses to determine if the MAC address in the magic packet is in the list. If so, the switch may determine which node is to be woken up. Is some implementations, an association of MAC addresses to node identifiers may be received along with the list of MAC addresses. In other implementations, the MAC address itself may be the node identifier. Upon determining the destination node for the magic packet, the switch may send an indication of the node to the chassis manager over the management network. The chassis manager may then cause the determined node to power on.

Figure 3:
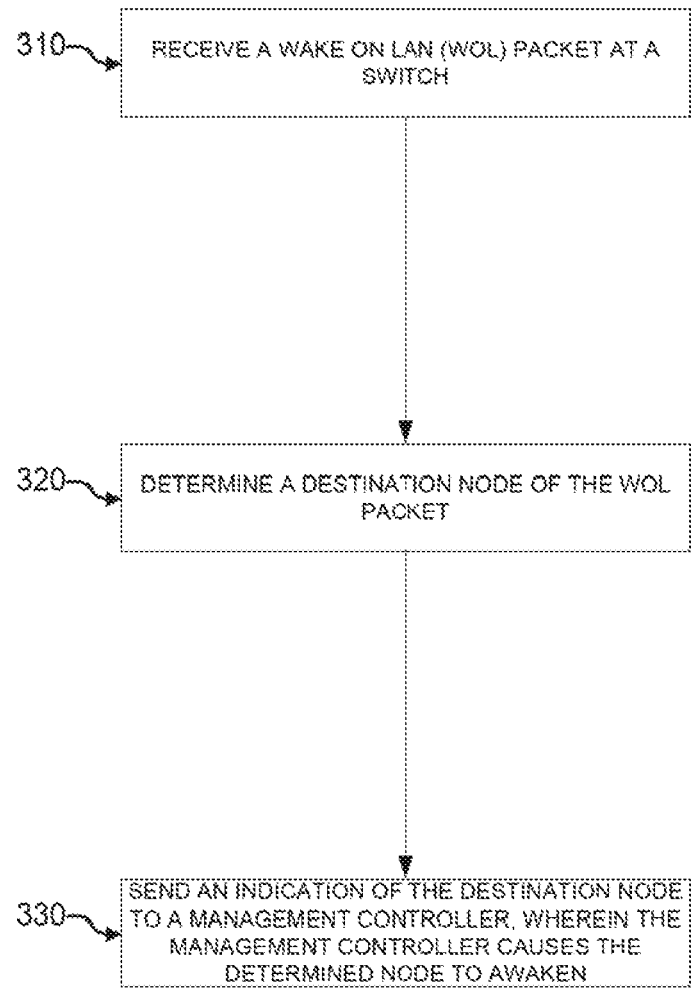
FIG. 3 is an example of a high level flow diagram for awakening a node according to the techniques described herein.

FIG. 3 is an example of a high level flow diagram for awakening a node according to the techniques described herein. In block 310, a WOL packet may be received at a switch. The WOL packet, may include information that may be used to identify the destination node of the WOL packet. As mentioned above, one example of such an identifier is a MAC address, although the techniques described herein are suitable for use with any type of identifier.

In block 320, the destination node of the WOL packet may be determined. For example, the information contained in the WOL packet may be used to determine the node that is the intended recipient of the WOL packet. For example, if the WOL packet contains a MAC address, the node that is associated with that MAC address may be identified.

In block 330, an indication of the destination node may be sent to a management controller. The management controller may cause the determined node to awaken. For example, the management controller may receive an indication as to which node was the destination node for the WOL packet. In some implementations, the node identifier may simply be the MAC address itself. In other implementations, the node identifier may be some other type of identifier. Regardless of the implementation, the management controller is able to determine which node is the intended recipient of the WOL packet. The management controller may then cause the determined node to awaken.

Figure 4:
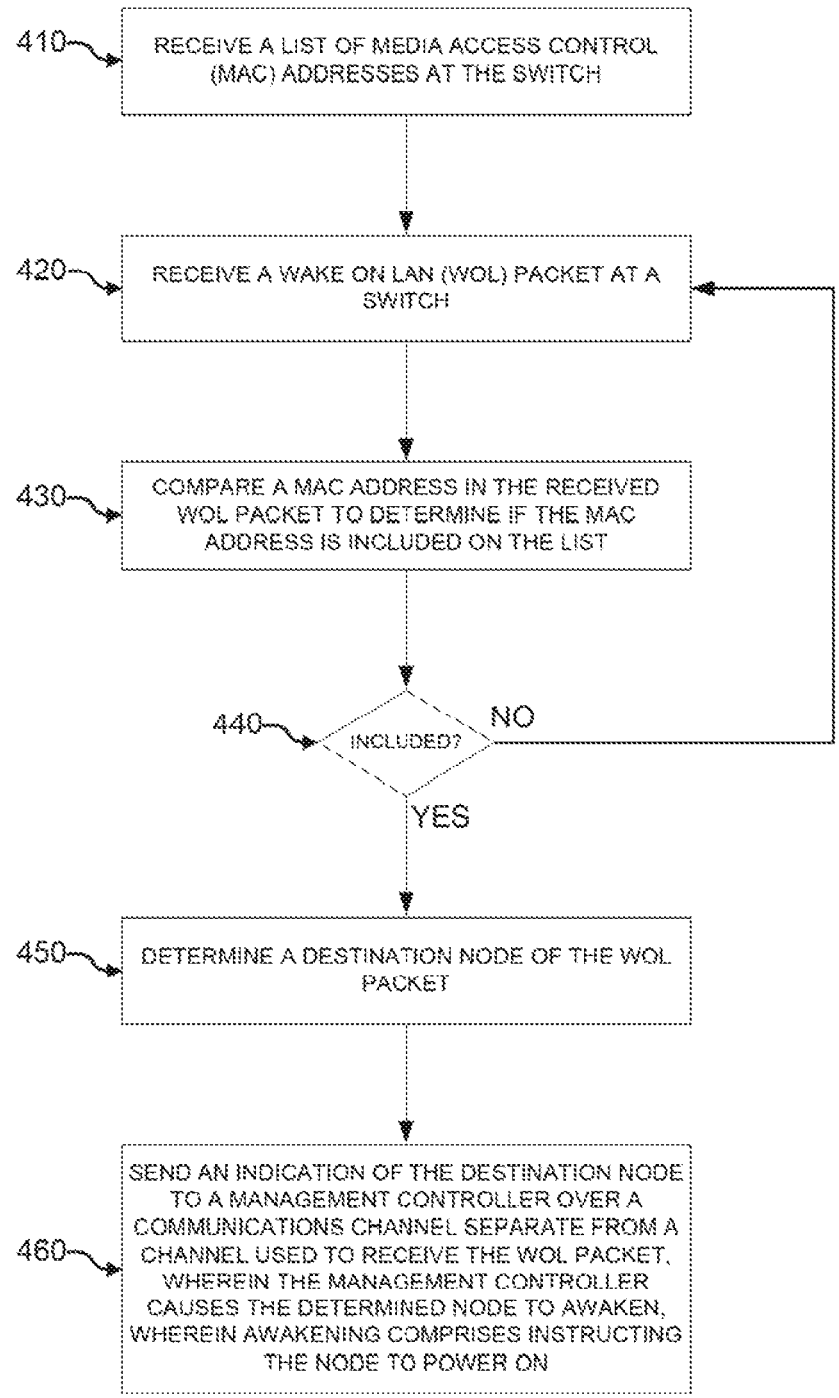
FIG. 4 is another example of a high level flow diagram for awakening a node according to the techniques described herein.

FIG. 4 is another example of a high level flow diagram for awakening a node according to the techniques described herein. In block 410, a list of MAC addresses may be received at a switch. These MAC address may be used by the switch to determine to which node a magic packet is destined. In block 420, a WOL packet may be received at the switch. The source of the WOL packet may be an external management system. The particular source of the WOL packet is unimportant, except to the extent that the WOL packet is intended to cause a node to awaken.

In block 430, a MAC address contained in the received WOL packet may be compared to determine if the MAC address is included on the list. In other words, the MAC address received in the WOL packet received in block 420 may be compared to the list of MAC addresses received in block 410, to determine if the MAC address included in the WOL packet was included in the list of MAC addresses. In block 440, if the MAC address is not included in the list, the process returns to block 420. If the MAC address is included in the list, the process moves to block 450.

In block 450, a destination node of the WOL packet may be determined. As explained above, the destination node may be the node that is associated with the MAC address contained in the WOL packet. In some implementations, there may be a list that correlates MAC addresses with destination nodes. In other implementations, the destination node may be determined directly from the MAC address. Regardless of implementation, the destination node for the WOL packet may be determined.

In block 460, an indication of the destination node may be sent to a management controller over a communications channel that is separate from a channel used to receive the WOL packet. In other words, a switch may receive the WOL packet over a channel such as an Ethernet network. The switch may then communicate the receipt of the WOL packet to the management controller over a separate communication channel. The second communication channel may itself be a network, such as an Ethernet network, or any other form of communication channel. What should be understood is that regardless of implementation, the first and second communication channels may be separate. The management controller may the cause the determined node to awaken. Awakening may comprise instructing the node to power on.

Figure 5:
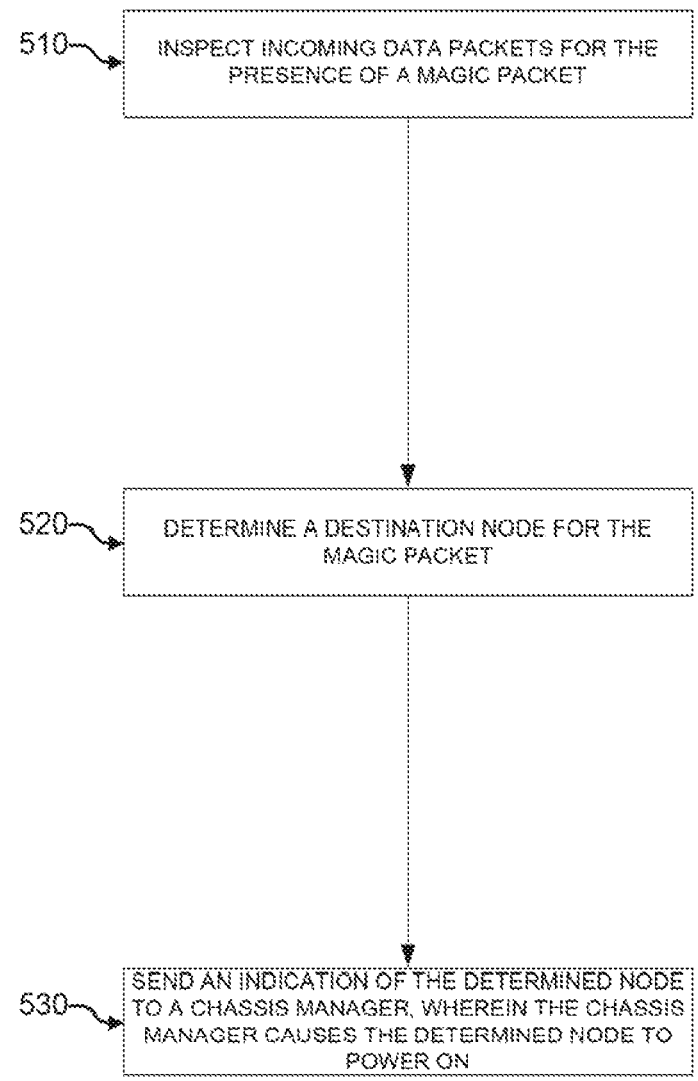
FIG. 5 is an example of a flow diagram for powering on a node after receipt of a magic packet according to techniques described herein.

FIG. 5 is an example of a flow diagram for powering on a node after receipt of a magic packet according to techniques described herein. In block 510, incoming data packets may be inspected for the presence of a magic packet. In other words, as each packet arrives, it may be inspected to determine if the packet is a magic packet or not.

In block 520, the destination node for the magic packet may be determined. Once it has been determined that a magic packet has been received, the switch may determine which node is the intended recipient of the magic packet. The magic packet may include the MAC address of the destination node, which may be used to determine the destination node.

In block 530, an indication of the determined node may be sent to a chassis manager. As explained above, the chassis manager may provide some or all of the functionality of a MC. The chassis manager may cause the determined node to power on. As explained above, the chassis manager is coupled to each node, and may have the ability to power the node up and down.

Figure 6:
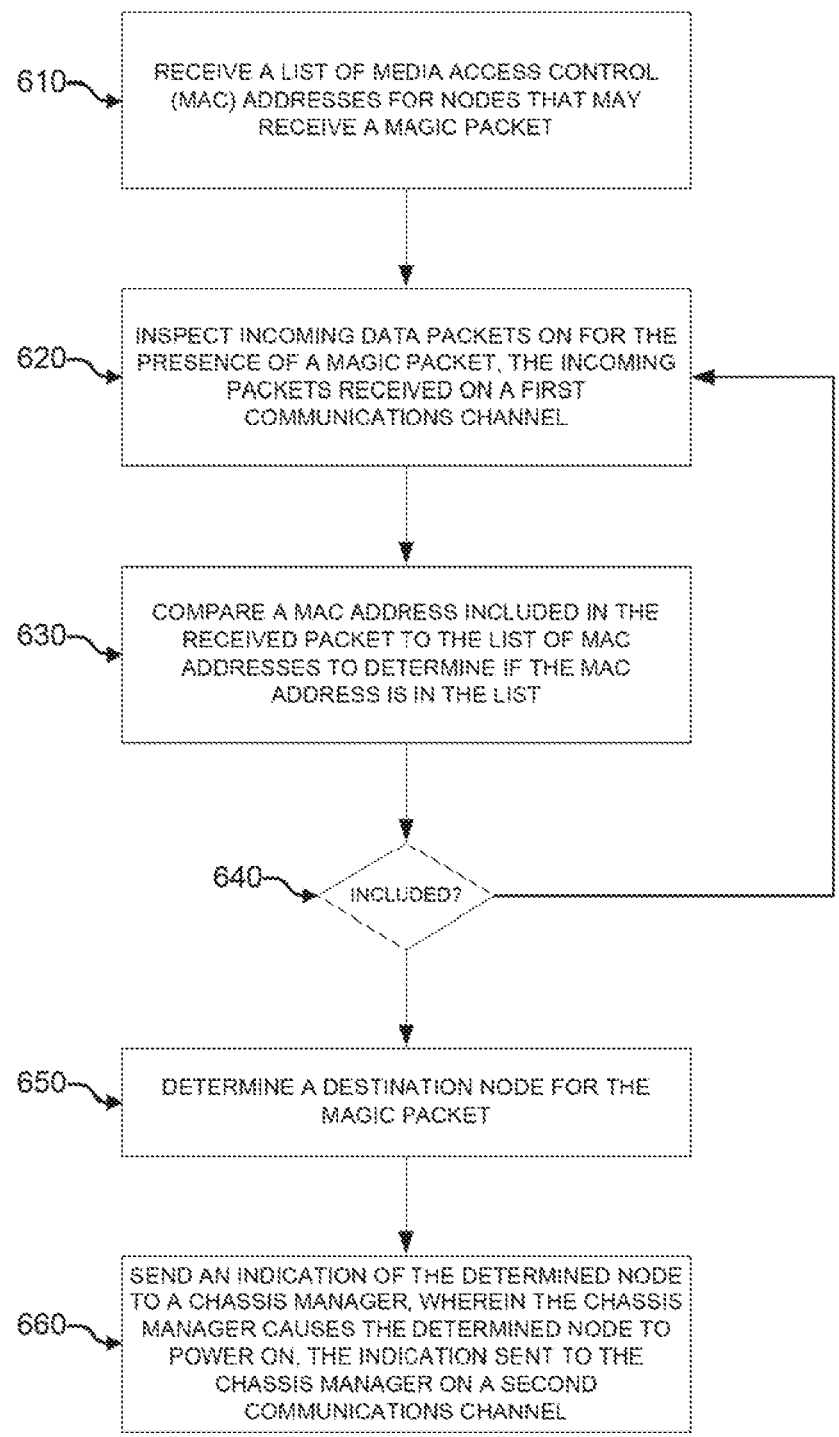
FIG. 6 is another example of a flow diagram for powering on a node after receipt of a magic packet according to techniques described herein.

FIG. 6 is another example of a flow diagram for powering on a node after receipt of a magic packet according to techniques described herein. In block 610, a list of MAC addresses for nodes that may receive a magic packet is received. In other words, this is the list of MAC addresses for which the switch should look for magic packets. In block 620, incoming data packets may be inspected for the presence of a magic packet. The incoming packets may be received on a first communications channel. For example, the first communications channel may be a production Ethernet network.

In block 630, the MAC address included in the received magic packet may be compared to the first of MAC addresses to determine if the MAC address is in the list. In other words, it is determined if the received magic packet is for a node for which the switch is looking for magic packets. In block 640, if the MAC address is not included in the list, the process returns to block 620. If the MAC address is included in the list, the process moves to block 650.

In block 650, the destination node for the magic packet may be determined. For example, each MAC address may be associated with a node. Given a MAC address, it is then possible to determine which node is associated with that MAC address. In block 660, an indication of the determined node may be sent to a chassis manager. The chassis manager may cause the determined node to power on. The indication that is sent to the chassis manager may be sent on a second communications channel. In other words, the switch may receive a magic packet over a first communications channel. An example of such a first communications channel may include a production Ethernet network. The switch may then send an indication to a chassis manager over a second communications channel, which is separate from the first. An example of a second communications channel may include a management Ethernet network. However, regardless of the type of network used, what should be understood is that the first and second communications channels may be separate from one another.

We claim:

1. A method comprising:
receiving a Wake on Lan (WOL) packet at a switch coupled to a first network in a system including the switch, a chassis including a plurality of nodes, a management controller coupled to the switch via a management network isolated from the first network, wherein the switch is separate from the chassis, the switch connects one or more of the plurality of nodes to the first network, a communications channel connects the plurality of nodes to the switch, the switch connects the plurality of nodes to the first network via the connection of the plurality of nodes to the switch by the communications channel, and the switch isolates the management network from the communications channel;
determining, at the switch, a destination node of the WOL Packet, wherein the destination node is one of the nodes and wherein the destination node includes a System on a Chip (SoC);
sending, by the switch, an indication of the destination node to the management controller via the management network isolated from the communications channel; and
in response to the indication, causing, by the management controller, power to be supplied to the SoC,
wherein the management controller causes the determined destination node to awaken.

2. The method of claim 1 wherein awakening comprises instructing the determined destination node to power on.

3. The method of claim 1 wherein the indication includes a node identifier of the determined node.

4. The method of claim 1 wherein the indication is sent to the management controller over a communications channel separate from a channel used to receive the WOL packet.

5. The method of claim 1 further comprising:
receiving a list of Media Access Control (MAC) addresses at the switch; and
comparing a MAC address in the received WOL packet to determine if the MAC address is included in the list.

6. The method of claim 5, wherein the MAC address in the received WOL packet corresponds to an integrated network interface card (NIC) of the SoC of the destination node.

7. The method of claim 1, wherein the switch is configured to send, over the communications channel, data packets received from the first network to destination nodes of the plurality of nodes.

8. A non-transitory processor readable medium containing thereon a set of instructions, which when executed by a processor of a switch, cause the processor to:
inspect incoming data packets of a first network for the presence of a magic packet,
wherein the switch is communicatively coupled to a chassis, which is external to the switch, that includes a plurality of nodes via the first network,
wherein the switch is communicatively coupled to a chassis manager via a management network isolated from the first network, the switch connects the plurality of nodes to the first network, a communications channel connects the plurality of nodes to the switch, the switch connects the plurality of nodes to the first network via the connection of the plurality of nodes to the switch by the communications channel, and the switch isolates the management network from the communications channel;
determine a destination node of the plurality of the nodes for the magic packet, wherein the destination node includes a System on a Chip (SoC) and is communicatively coupled to the first network; and
send an indication of the determined destination node to the chassis manager via the management network isolated from the communications channel,
wherein the chassis manager causes the determined destination node to power on by causing supply of power to the SoC.

9. The medium of claim 8 further comprising instructions to:
receive a list of Media Access Control (MAC) addresses for nodes that may receive a magic packet; and
compare a MAC address included in the received magic packet to the list of MAC addresses to determine if the MAC address is in the list, wherein the indication is sent if the MAC address is in the list.

10. The medium of claim 9, wherein the MAC address in the received WOL packet corresponds to an integrated network interface card (NIC) of the SoC of the destination node.

11. The medium of claim 8 wherein the nodes are System on a Chip (SoC) nodes.

12. The medium of claim 8 wherein the incoming data packets are received on a first communications channel and the indication is sent to the chassis manager on a second communications channel other than the first communications channel.

13. The medium of claim 8 wherein the indication includes a Media Access Control (MAC) address of the determined destination node.

14. The medium of claim 8 wherein the indication includes a node identifier of the determined destination node.

15. A system comprising:
a chassis including a plurality of nodes;
a first node of the plurality of nodes, the first node including at least one network interface identifiable by an address;
a first communications channel;
a switch separate from the chassis coupled to the first node through the first communications channel, wherein the switch to inspect incoming packets searching for a Wake on Lan (WOL) packet destined for the first node, the switch connects the first node to a first network via the coupling of the first node through the first communications channel, and the switch isolates a second communications channel from the first communications channel; and
a Management Controller (MC) to receive an indication from the switch over the second communications channel that the WOL packet for the first node has been received, wherein the MC to cause the first node to power on.

16. The system of claim 15 wherein the first node is a System on a Chip (SoC), and wherein power on of the first node includes causing power to be supplied to the SoC.

17. The system of claim 16 wherein the at least one network interface comprises a network interface card that is integrated to the SoC.

18. The system of claim 15 wherein the first communications channel comprises a production Ethernet network and the second communications channel comprises a management Ethernet network.

* * * * *